Feb. 16, 1960 R. J. HOLTON 2,924,864
FASTENING DEVICE
Filed Dec. 20, 1957
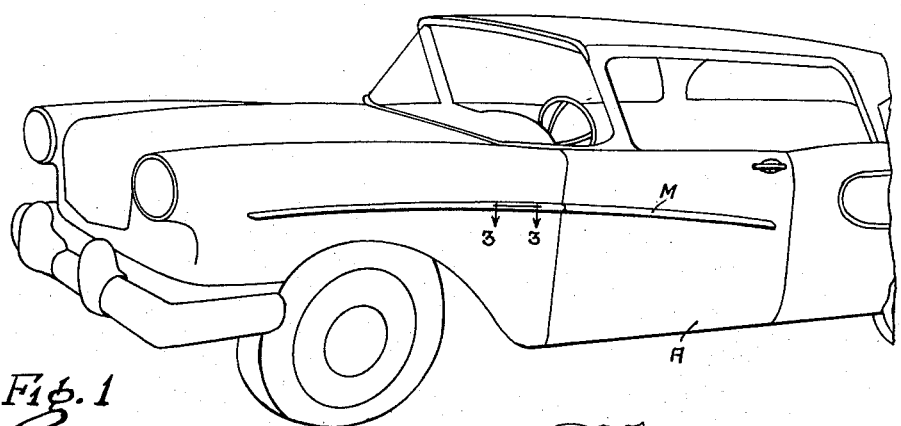
Fig. 1
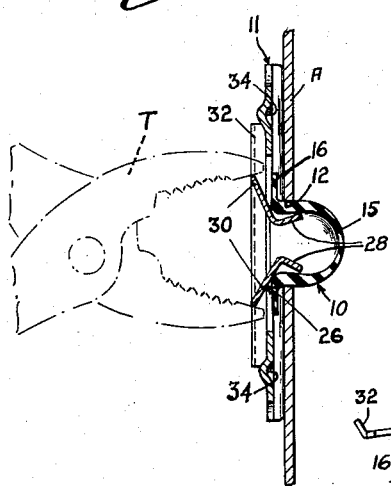
Fig. 2
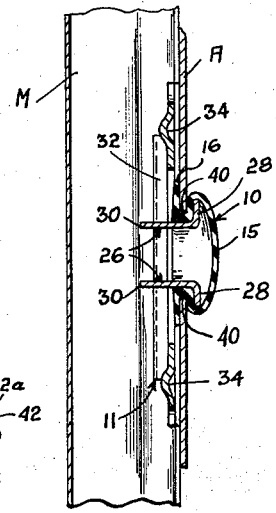
Fig. 3
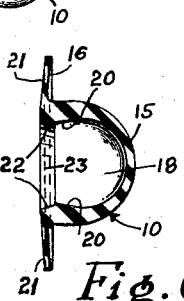
Fig. 4a
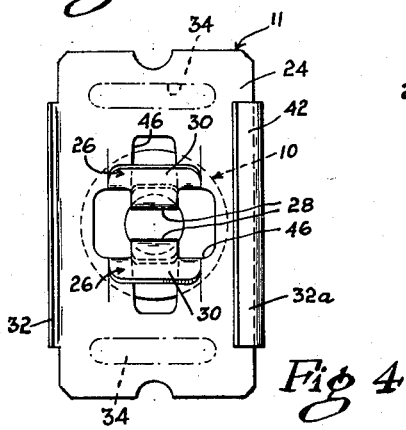
Fig. 4
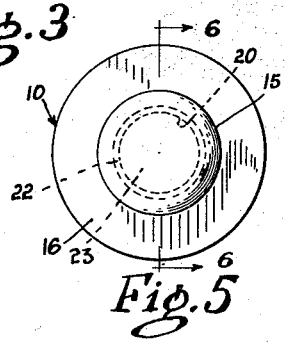
Fig. 6
Fig. 5
INVENTOR.
ROBERT JAY HOLTON
BY
Bates, Teare & McBean
ATTORNEYS United States Patent Office 2,924,864
Patented Feb. 16, 1960

2,924,864

FASTENING DEVICE

Robert Jay Holton, Cleveland, Ohio, assignor to Tinnerman Products Inc., Cleveland, Ohio, a corporation of Ohio Application December 20, 1957, Serial No. 704,065

7 Claims. (Cl. 24—73)

This invention relates in general to clips or fasteners for mounting moldings, trim strips, cables and the like on a supporting part and more particularly concerns a combined securing and sealing device which is adapted to be positively secured in a work opening in a supporting part by an operation taking place entirely from the outer or accessible side of the supporting part, and which will effectively seal the work opening against the entry of water, dust, foreign matter and the like.

Clip fasteners for securing moldings and the like on a supporting part, in combination with a sealing portion or plug for sealing the work opening in the supporting part, are known in the art. However, in most of these prior art devices, the sealing portion or plug is molded onto the clip or fastener proper to form a unitary arrangement. Procedures for molding and securing the sealing element or plug to the clip proper are time consuming and expensive, and do not always result in an entirely satisfactory arrangement. Sometimes, the adhesion of the sealing plug to the clip fails, and the plug is separated from the clip, thereby resulting in unsealing of the work opening and entry of water, dust, etc., to the obvious detriment of the supporting part and clip assembly.

The present invention provides a sealing plug or element which may be readily and quickly assembled in interlocking relationship with the clip proper to provide a combined securing and sealing device which is easily assembled in secured and positive sealing relationship in the work opening of the supporting part. The sealing element or plug of the invention may also be readily disassembled from the clip proper, before mounting of the latter on the supporting part, and which may be economically manufactured, using mass production methods, to provide a highly advantageous securing clip and sealing assembly.

The sealing element or plug of the invention broadly comprises a generally hollow cap or head portion which is adapted to receive therein arm portions of the clip proper in holding relationship for mounting the sealing element in assembled relationship on the clip, and a peripheral flange portion which is adapted to overlap the marginal edges of the work opening in the supporting part and be compressed between the supporting part and the body of the clip for positively sealing the work opening. The clip proper of the combined securing and sealing device is of the general character which comprises a sheet metal element defining a body or base carrying a pair of arms which include shank portions that are receivable through the work opening and which deform the cap or head portion of the sealing element or plug into positive sealing relationship, and will also secure the clip in fastening position on the supporting part by expansion of the shank portions into locking relationship with marginal portions of the work opening.

An object of the invention is to provide a sealing element or plug which can be readily assembled with and disassembled from an associated object securing clip, and which will effectively seal the work opening in a supporting part on which the clip is mounted.

Another object of the invention is to provide a sealing element of the latter mentioned type which is comparatively simple in nature and which may be economically produced, and which is particularly adaptable to mass production methods.

A further object of the invention is to provide a sealing element which is formed of relatively soft and pliable material for ready assembly with an associated fastening device for effectively sealing a work opening in a supporting part on which the fastening device is mounted, and which comprises a hollow, dome-like head portion and a base in the form of a peripheral flange or brim portion which are deformable into sealing relationship with marginal and defining portions, of the work opening.

Another object of the invention is to provide a combined sealing and securing device assembly in the form of a clip fastener in which the sealing element of the assembly is readily attached to and detachable from the clip proper, and wherein the fastener assembly can be quickly and securely fastened over a work opening in a supporting part or panel, with the sealing element of the assembly extending through the work opening and positively sealing the latter against the entry of water, dust, etc.

A still further object of the invention is to provide a securing and sealing clip assembly of the latter mentioned type in which the clip proper embodies bendable arms having portions thereof received in holding relationship with the sealing plug element and wherein such arm portions function to secure the clip assembly to the supporting part and to urge the sealing element into positive sealing relationship with marginal portions of the work opening.

Other features and advantages of the invention will be apparent from the following description taken in conjunction with the accompanying drawings wherein:

Fig. 1 is a perspective view illustrating one environmental setting in which the securing and sealing clip of the present invention may be advantageously used, and more particularly showing an automobile vehicle having a trim strip or molding mounted on a side thereof by the fastener and sealing clip of the instant invention.

Fig. 2 is an enlarged, horizontal, sectional view of the securing and sealing clip fastener of the invention in its preliminary assembled form on a supporting panel or the like, with a tool engaging the arms of the clip proper, in the procedure for attaching the clip in secured, sealing relationship on the supporting panel.

Fig. 3 is an enlarged, horizontal, sectional view generally similar to Fig. 2 and taken substantially along line 3—3 of Fig. 1, for illustrating the clip and sealing plug in finalized secured and sealing position on supporting part, and with a trim strip or molding being held in mounted position on the supporting part by the clip fastener.

Fig. 4 is an enlarged front or outer side view of the clip and sealing element assembly of the invention.

Fig. 4a is an edge elevation taken from the bottom side of Fig. 4.

Fig. 5 is an enlarged rear end elevational view of the sealing element of the invention.

Fig. 6 is a vertical, sectional view taken generally along line 6—6 of Fig. 5.

Referring now more particularly to the drawings, there is disclosed a preferred form of the sealing element or plug 10 and the combined securing clip and sealing element assembly which is adapted to be applied and secured in a work opening 12 in a supporting part, such as a panel A or the like, as illustrated in Fig. 3, and in position for mounting a molding M or similar object on the supporting part A.

The supporting part A is usually in the form of a plate or panel, or the like, as for instance the side panel of the automotive vehicle shown in Fig. 1, and is provided with a series of spaced openings for the required number of clips 11 to be secured thereto, along the path which the molding M is to extend when in mounted position. The panel A may be of any suitable material, such as metal, wood, plastic, fibre wood and the like, and the openings 12 therein may be round, rectangular, or of any suitable outline, but are generally provided in the manner of circular or rectangular holes which involve the most inexpensive means of producing the same.

The separable or detachable sealing element or plug 10 of the invention is preferably formed of soft pliable plastic or rubber-like material, and comprises a generally hollow, dome shaped head portion 15 and a base in the form of a peripheral flange or brim portion 16 which extends generally radially outwardly from the head portion. As shown, plug 10 is of an uncomplicated design which readily lends itself to mass production methods, thereby resulting in an inexpensive sealing element. Referring in particular to Fig. 6, it will be seen that the inner surface of the head portion 15, which defines the open cavity or pocket 18 in the plug, generally converges as at 20, adjacent the juncture of the head portions with the flange or brim portion 16, which results in a thickening of the defining wall of the head portion in this location, as compared to the summit of the dome, and then diverges generally outwardly as at 22 to form a relatively wider entrance way 23 into cavity 18. The purpose and functioning of the latter construction will be hereinafter described in detail. It will also be noted that the brim portion 16 is preferably generally sloped, as at 21, with respect to the longitudinal axis of the sealing element and towards the summit or rearward end of the head portion 15.

Brim portion 16 is made of sufficient radial extension so as to substantially overlap or overlie the confronting marginal portions of the work opening 12 in panel A, while the head portion 15 of the sealing plug is preferably of a size to be readily received in work opening 12, with the defining wall of the head portion just engaging the defining edges of the work opening, as is shown in Fig. 2.

The securing clip member 11 is preferably comprised of a sheet metal blank which defines the base or body 24 of the clip proper and is provided with a partially severed area, preferably in the approximate center thereof, as best seen in Fig. 4, forming a pair of movable arms 26 which are bendable or hingedly connected to base 24 along bend lines disposed intermediate opposite free ends of each of the arms. The general arrangement of the necessary slits for forming the bendable arms from the body portion of the clip as shown, is disclosed in copending U.S. application Serial Number 542,417 of Robert J. Holton, filed October 24, 1955, and accordingly will not be described here in detail. It is merely sufficient to state that moveable arms 26 comprise tongue or shank portions 28 joined to elongate tab or head portions 30. Each of the tabs 30 has a free end and is bendably connected to the base of the clip and carries the tongue or shank portion 28 which has a free end extending in the opposite direction from the free end of the tab portion 30. When the arms 26 are bent from the base or body 24 of the clip as shown in Fig. 2, the free ends of the tab elements 30 project outwardly from the front or outer surface of the clip base while the free ends of the tongues or shanks 28 project inwardly or rearwardly from the inner or undersurface of the fastener base. The arms 26 thus are united to the fastener base 24 in bendable connection intermediate the length of the arms and in a manner whereby the tongue or shank portions 28 at the inner or undersurface of the clip base are moveable outwardly from each other responsive to inward movement of the head or tab elements 30 projecting from the forward or outer surface of the base, and where they are therefore readily accessible for securing the clip or fastener in a work opening, such an operation taking place entirely from the outer side of a support assembly.

Preferably, the head or tab elements 30 are provided in forwardly divergent relationship substantially as shown in Figs. 2 and 4, with the tongues or shanks 28 carried thereby curved or directed initially inwardly toward one another, and then outwardly away from one another, to provide a pair of cooperating shank elements in the form of outwardly extending hooks or the like, projecting from the undersurface of the fastener base 24. Such shank or hook portions are adapted to be readily received through the work opening 12 in the panel A, and into coacting relationship with the sealing plug element 10, for securing the clip to the supporting part and for urging or deforming the sealing plug into positive sealing relationship with marginal portions of the work opening, as will be hereinafter described in greater detail.

The clip proper otherwise has opposite sides or ends thereof bent to define a pair of generally resilient flanges or similar retaining portions 32 and 32a adapted for fastening engagement with inturned flanges on the molding M, or for similar attachment with the inner walls of a hollow or channel shaped object, such as trim strip or the like, in a manner well known to those skilled in the art.

Opposite ends of the body portion 24 of the clip proper have been deformed from the rearward or underside thereof to form depressions as at 34 (Figs. 2, 3 and 4), whereby such end portions are caused to assume a generally arcuate configuration, as best shown in Fig. 4a. This arcuate configuration is for the purpose of insuring a generally tension engagement between the clip body and the supporting panel A when the clip and sealing device assembly is in mounted and secured relationship on the panel.

In mounting the securing and sealing clip of the invention on the supporting part or panel A, a sealing plug or element 10 is first positioned over the hooks or shank portions 28 of the arms 26 of the clip proper, and then is forced downwardly into seating relationship with the rearward or underside of the body 24 of the clip. In this connection, the outwardly flared portions 22 of the sealing cap member 10 coact in sliding relationship with the free ends of the shank portions 28 of the arms 26, and serve to cam the shank portions through the inwardly restricted entrance way 23 of the sealing plug, into the cavity 18 of the plug. During movement of the shank portions into the cavity 18, the material of the sealing element is deformed or stretched so as to permit passage of the shank portions therethrough, but once the shank portions pass the ridge of the converging surfaces 20 of cavity 18, the "elastic memory" or resiliency of the material of the sealing element causes the latter to assume its normal non-deformed shape, with the sealing element being held in positive assembled position on the clip proper by the interlocking coaction between shank portions 28 and the converging portions 20 of the sealing element. The proper number of work openings are prepared in a line running along a predetermined path in which the molding M is to extend, and the coacting head portion 15 of a sealing element 10 and shank portions 28 of arms 26 of a clip and sealing element assembly are fed through each of the work openings substantially as shown in Fig. 2. The size of the work opening is preferably such that the head portion 15 and shank portions 28 are readily received therethrough with the outer surface of the dome of the sealing element just barely touching the defining surfaces for the work opening and the free ends of the shank portions projecting beyond the rearward or underside of the panel A. The tabs 30 which have free ends projecting from the front or outerside of the assembly are readily accessible for quick and easy actuation by suitable tool such as the pliers shown in Fig. 2, to compress the tabs from the diverging relationship of Fig. 2 to substantially parallel relationship, as shown in Fig. 3.

Such movement of tabs 30 towards each other, causes the arms 26, including the shank portions or hooks 28, to pivot about their bendable connections to base 24 in a manner whereby the hooks are forced outwardly with respect to one another and overlap the adjacent edges of the work opening 12 on the rearward or underside of support panel A. During such movement of the shank portions 28, the head portion 15 of sealing element 10 is stretched in the direction of movement of the shank portions, whereby, portions of the defining wall of the head 15 are urged into overlapping relationship with marginal edge portions of panel A around the work opening 12. As the free ends of the shank portions 28 of the arms 26 deform and urge the head portion 15 into generally coplanar relationship with respect to the rearward or underside of panel A, the arms also draw the body 24 of the clip towards and into tensioned engagement with the front or outer side of the support panel A, while at the same time compressing the rim or flange portion 16 of the sealing element 10 into positive sealing engagement against marginal portions of the front side of the support panel, in the vicinity of work opening 12. The aforementioned slope 21 of brim portion 16 toward the head portion 15 of the sealing element helps to insure a continuous engagement between the periphery of the brim portion and the front or outer surface of support panel A, and therefore an effective sealing of work opening 12 in the panel. The aforementioned arcuate configuration of the clip proper, occasioned by the indentations 34 as aforedescribed, provides for the tensioned engagement of the clip body with the support panel, and therefore aids in maintaining the clip in proper assembled positions on the panel A. It will be seen therefore that the sealing element 10 is effectively urged into overlapping, generally coplanar relationship with both sides of the support panel A, adjacent the work opening, and is held in such relationship by the arms 26 and body 24 of the clip proper, and that the arms 26 also urge the head portion 15 of the sealing element into coplanar sealing relationship, as at 40 (Fig. 3), with defining surfaces of the work opening 12, to provide a very effective seal against the entry of water, dust, etc. The base or flange portion 16 of the sealing element is preferably continuous and large enough so as to completely cover and extend past all peripheral edges of the work opening 12.

In mounting the molding M on the panel A, as many clips or fasteners as are necessary are similarly secured in work openings prepared in said panel A in generally aligned relation along the path in which the molding M is to extend in a completed assembly. The molding M is then positioned over the clips with one of the conventional inturned flanges of the molding disposed in overlapping, interlocking relation with flange 32 on the clip body, and with the extremity of the other conventional flange of the molding engaging the cam surface 42 (Fig. 4a) on the other of the flanges 32a on the body of the clip. When downward pressure is exerted on the top of the molding M, the free end of the non-interlocked flange on the molding is sprung into attached position on the flange 32a, in a manner well known to those skilled in the art, to complete the mounting of the molding M on the panel or other supporting part A. This operation is in the nature of a snap fastening action which takes place as a result of the inherent resiliency of the inturned flanges on the molding.

If it becomes desirable or necessary to replace or repair the supporting panel A, as often occurred in the automotive environmental setting illustrated, the molding M may be readily snapped out of interlocking relationship with the flanges 32, 32a, on the clip body, the tabs 30 on the arms 26 then being accessible for bending away from one another, whereby the shank portions 28 are moved inwardly towards one another and out of interlocking relationship with the inner or underside of the supporting panel. The securing and sealing clip assembly can then be easily withdrawn from the work opening 12.

A feature of the invention is that the clips and associated sealing elements can be used again if desired in reassembling the molding on a new panel or on the same panel, or new sealing elements may be easily assembled with the clips, and then the clips may be conveniently reassembled on the support panel. The latter is not true with a clip having the variety of sealing plug that is molded to the clip proper. In this connection, the sheared portions 46 (Fig. 4) of the body 24 of the clip proper from which the arms 26 are formed provide convenient access openings into which a sharpened instrument, such as a screwdriver, may be inserted between the brim portion 16 of the sealing element and the body 24 of the clip, for forcing or popping the sealing element out of assembled relationship with the hook portions 28 of the arms, the defining edges of the sheared portions 46 providing an effective fulcrum for urging the converging portions 20 of the sealing plug past the outwardly directed hook portions 28.

The clips or fasteners are preferably constructed of relatively thin sheet metal, the thickness of which is selected according to service requirements and the predetermined size of the object or article to be mounted or secured thereby. The clips or fasteners are most effective when provided of malleable spring metal suitably tempered and otherwise treated to give the desired toughness and hardness, particularly in the case of devices which are intended for heavy duty application. Such "malleable-type" metal possesses the characteristic that it may be permanently deformed upon application of predetermined force as distinguished from a purely spring type metal which when deformed will return to its original position upon removal of the bending force. An inexpensive and highly satisfactory clip or fastener may be provided from cold rolled metal such as cold rolled steel which is untempered but of a malleable spring metal nature and capable of providing an effective and reliable securing device as and for the purposes described.

From the foregoing description and accompanying drawings, it will be seen that the invention provides a novel inexpensive sealing element for detachable assembly with a securing clip device, for effectively sealing a work opening in a supporting part of panel against the entry therethrough of water, dust, foreign matter and the like. The invention also provides a combined securing clip and sealing device assembly which is readily secured in proper mounted position in a work opening in a supporting part, and which will positively seal the work opening and provide means for readily mounting an object on the supporting part, the entire mounting operations taking place from the outer or accessible side of the supporting part. The invention also provides a securing clip and sealing assembly which can be conveniently reused or can be inexpensively renewed by using a new sealing element, the lattter being easily and quickly assembled or disassembled from the clip proper.

The terms and expressions which have been used are terms of description and not of limitation and there is no intention in the use of such terms and expressions of excluding any equivalents of the features shown and described or portions thereof, but it is recognized that various modifications are possible within the scope of the invention claimed.

I claim:
1. A deformable sealing element for a work opening in a part, such as a panel, and adapted for detachable assembly with a sheet metal object securing clip of the type which includes a body portion having a generally planar surface thereon and a pair of spaced movable shank elements projecting from such surface of the body portion, said sealing element being comprised of pliable material, such as rubber, and including a base in the form of a continuous flange portion and a head portion projecting from said flange portion, said flange portion having an outer terminal edge which is disposed in outwardly spaced relation to the external configuration of said head portion, said head portion having a cavity therein, said base having a passageway extending therethrough to a juncture with said cavity to provide communication between the latter and the exterior of said sealing element, said cavity being adapted to receive the shank elements of the clip therein for mounting said sealing element in substantially undeformed condition on the clip, a portion of the interior defining surface of said cavity sloping obliquely outwardly in a direction away from said base in the undeformed condition of said sealing element, to provide abutment means engageable in interlocking coaction with at least one of the shank elements of the clip in the assembled condition of said sealing element and clip, to resist inadvertent disassembly of the latter.

2. A sealing element in accordance with claim 1 wherein said passageway is flared in a direction outwardly of said cavity for camming coaction with the shank elements of the clip to facilitate entry of the shank elements into said cavity during mounting of said sealing element on the clip.

3. A deformable sealing element for a work opening in a part, such as a panel, and adapted for detachable assembly with a sheet metal object securing clip of the type which includes a generally planar body portion and a pair of spaced movable shank elements projecting from one surface of the body portion and a pair of spaced shank actuating tab elements projecting from the opposite surface of the body portion, said sealing element being comprised of resilient material, such as rubber, and having a hollow head portion of generally dome-shaped exterior configuration and a base in the form of a continuous flange portion extending generally radially from said head portion, the outer defining edge of said flange portion being disposed in outwardly spaced relation to the outer periphery of said head portion, said hollow head portion defining a cavity of a configuration similar to the exterior configuration of said head portion and communicating with the exterior of said element by means of a passageway extending through said base to a juncture with said cavity, said cavity being adapted to receive the shank elements of the clip therein for mounting said sealing element in substantially undeformed condition on the clip with the shank elements disposed in generally juxtapositioned relation to confronting surface portions of said cavity, the interior defining surface portions of said cavity adjacent said juncture extending obliquely outwardly in a direction away from said base in the undeformed condition of said sealing element to form an interior generally circumferentially extending abutment section engageable with the shank elements in the assembled condition of said sealing element and clip, to resist withdrawal of the shank elements from said cavity and thus maintain said sealing element and clip in assembled relation.

4. A deformable sealing element for a work opening in a part, such as a panel, and adapted for detachable assembly with an object securing sheet metal clip of the type which includes a body portion having a generally planar surface thereon and a pair of spaced movable shank elements projecting from such surface of the body portion, said sealing element being comprised of pliable material such as rubber, and including a base in the form of a continuous circular flange portion and a generally centrally disposed hollow head portion projecting from said flange portion, said flange portion having an outer terminal edge which is disposed in outwardly spaced relation to the external configuration of said head portion, said hollow head portion defining a cavity therein, said base having a passageway extending therethrough to a juncture with said cavity to provide communication between the latter and the exterior of said sealing element, said cavity being adapted to receive the shank elements of the clip therein for mounting said sealing element on the clip, said flange portion being disposed obliquely with respect to said head portion and slanting outwardly therefrom in the direction of projection of said head portion.

5. In combination, a malleable-like sheet metal clip adapted for mounting over a work opening in a supporting part and comprising a generally planar body and a pair of spaced moveable arms integrally connected to said body intermediate the ends of said arms and substantially in the plane of said body, said arms defining a pair of shank elements projecting from one surface of said body and a pair of shank actuating tabs projecting from the opposite surface of said body, and a deformable sealing element comprised of pliable material, such as rubber, detachably mounted on said clip, said sealing element being adapted to extend through the work opening in the supporting part and seal the work opening against the passage of foreign matter in the attached position of said clip, said sealing element comprising a base in the form of a continuous flange portion engageable with said one surface of said body and a hollow head portion projecting from said flange portion in a direction away from said one surface, said flange portion having an outer defining edge disposed in outwardly spaced relation to the exterior configuration of said head portion, said head portion defining a cavity which communicates with the exterior of said sealing element by means of a passageway extending through said base to a juncture with said cavity, said shank elements being received through said passageway into said cavity to mount said sealing element in substantially undeformed condition on said clip with said shank elements being disposed in generally juxtapositioned relation to confronting surface portions of said cavity, at least one of said surface portions extending obliquely outwardly in a direction away from said base in the undeformed condition of said sealing element, to provide an abutment engageable with the respective one of said shank elements to resist withdrawal of said shank elements from said cavity and thus maintain said sealing element and clip in assembled relation.

6. A combined object securing and sealing clip adapted for mounting over a work opening in a supporting part and comprising a generally planar malleable like sheet metal body having partially severed portions defining a pair of spaced movable arms integrally connected to said body intermediate the ends of said arms and substantially in the plane of said body, said arms defining a pair of tabs facing each other and projecting from one surface of said body and generally outwardly bent shank elements carried by said tabs projecting from the opposite surface of said body, a detachable sealing element of pliable material carried by said clip on said body, said sealing element comprising a base in the form of a continuous flange portion engaging said opposite surface and a generally hollow head portion projecting from said flange portion in a direction away from said opposite surface, said head portion defining a cavity therein communicating with the exterior of said sealing element by means of a passageway extending through said base to a juncture with said cavity, said shank elements extending through said passageway and into said cavity to mount said sealing element in substantially undeformed condition on said clip and with said shank elements disposed in generally juxtapositioned relation to confronting surface portions of said cavity, obliquely disposed abutment means in said cavity engageable with at least one of said shank elements to resist withdrawal of said shank elements from said cavity and thus maintain said sealing element in assembled relation on said clip, said passageway being flared in a direction outwardly of said cavity to provide a camming coaction between the outer ends of said shank elements and defining surface portions of said passageway during mounting of said sealing element on said clip, said shank elements and said head portion being receivable through the work opening from one side of the supporting part and said shank elements being movable outwardly to generally permanently deformed positions and in secured relation in the work opening responsive to inward movement of said tabs to generally permanently deformed positions, whereby said head portion of said sealing element will be caused to be deformed by said shank elements and sections of said head portion will be clamped between said shank elements and the other side of the supporting part, and means projecting from said one surface of said body for mounting an object on the supporting part.

7. In a fastening assembly comprising a supporting part, such as a panel, having a work opening therethrough, a malleable-like sheet metal clip mounted on said supporting part over said work opening and comprising a generally planar body and a pair of spaced movable arms integrally connected to said body intermediate the ends of said arms and substantially in the plane of said body, said arms defining a pair of tabs projecting from one surface of said body and a pair of shank elements projecting from the opposite surface of said body, said shank elements being of generally outwardly directed bent configuration, and a deformable sealing element comprised of generally resilient material detachably mounted on said clip, said sealing element comprising a base in the form of a continuous flange portion disposed intermediate said body and one side of said supporting part and a generally hollow head portion projecting from said flange portion and extending through said work opening, said flange portion having an outer defining edge disposed in overlapping relation to the defining edge of said work opening, said head portion defining a cavity therein, said base having a passageway therethrough providing a communication from said cavity to the exterior of said sealing element, said shank elements extending into said cavity and in generally juxtapositioned relation to defining surface portions thereof and being moved outwardly to generally permanently deformed positions and in secured relation in the work opening in response to inward movement of said tabs to generally permanently deformed positions, said shank portions upon said movement thereof deforming said head portion of said sealing element against defining surface portions of said work opening and clamping sections of said head portion between said shank elements and the other side of the supporting part and in engaged relation therewith, to close the work opening against the passage of foreign matter in the secured position of said shank elements.

References Cited in the file of this patent

UNITED STATES PATENTS

| 712,403 | Oldenberg | Oct. 28, 1902 |
| 1,694,291 | Sywert | Dec. 4, 1928 |
| 2,048,274 | Luby | July 21, 1936 |
| 2,102,578 | Gail | Dec. 14, 1937 |
| 2,139,244 | Nauert | Dec. 6, 1938 |
| 2,166,916 | Lombard | July 18, 1939 |
| 2,693,009 | Beck | Nov. 2, 1954 |

FOREIGN PATENTS

| 106,038 | Great Britain | May 10, 1917 |
| 743,591 | Great Britain | Jan. 18, 1956 |